United States Patent
Sparks

(10) Patent No.: US 8,919,376 B2
(45) Date of Patent: Dec. 30, 2014

(54) HYDRODYNAMIC RAM MITIGATING FUEL CELL STRUCTURE

(75) Inventor: Chad Elliot Sparks, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/699,937

(22) PCT Filed: Jun. 13, 2011

(86) PCT No.: PCT/US2011/040171
§ 371 (c)(1),
(2), (4) Date: Nov. 26, 2012

(87) PCT Pub. No.: WO2012/173594
PCT Pub. Date: Dec. 20, 2012

(65) Prior Publication Data
US 2013/0206265 A1    Aug. 15, 2013

(51) Int. Cl.
*B64D 37/32* (2006.01)
*B64D 37/08* (2006.01)
*F02M 37/00* (2006.01)
*H01M 8/04* (2006.01)
*B64D 41/00* (2006.01)

(52) U.S. Cl.
CPC .......... *F02M 37/00* (2013.01); *B64D 2041/005* (2013.01); *B64D 2037/325* (2013.01); *B64D 37/32* (2013.01); *Y02T 90/32* (2013.01); *Y02T 50/44* (2013.01); *H01M 2250/20* (2013.01); *Y02T 90/36* (2013.01); *H01M 8/04089* (2013.01); *Y02E 60/50* (2013.01); *H01M 8/04201* (2013.01)
USPC ..... 137/574; 137/576; 244/135 R; 244/123.6; 220/563

(58) Field of Classification Search
CPC ................ B64D 37/32; B64D 2700/62403; B64D 37/08; F17C 2260/042
USPC ................ 137/574, 576; 244/135 R, 123.6; 220/563
See application file for complete search history.

(56) References Cited

U.S. PATENT DOCUMENTS 2,850,083 A    9/1958  Frost
5,934,618 A    8/1999  Kari et al.
(Continued)

FOREIGN PATENT DOCUMENTS

CA    705745 A    3/1965
GB    609314       9/1948
WO    97/27105 A1  7/1997

OTHER PUBLICATIONS

International Search Report from associated Application PCT/US2011/040171 dated Oct. 20, 2011 issued by the International Searching Authority, 8 pages.
(Continued)

*Primary Examiner* — Atif Chaudry
(74) *Attorney, Agent, or Firm* — James E. Walton; Richard G. Eldredge

(57) ABSTRACT

A system and method to mitigate the effect of hydrodynamic ram. The system including a chamber adapted to receive fluid and a core disposed within the chamber. A plurality of columns extend through the core and a plurality of orifices extend through the thickness of the columns. The method includes channeling a portion of a vapor bubble to an ullage space disposed within the chamber with the plurality of columns and changing the fluid state of the vapor bubble with a plurality of orifices extending through the thickness of the plurality of columns.

14 Claims, 6 Drawing Sheets

(56) References Cited

U.S. PATENT DOCUMENTS 6,910,659 B2 * 6/2005 Friddell et al. ............ 244/135 R
7,090,167 B2   8/2006 Friddell et al.

OTHER PUBLICATIONS

Extended European Search Results dated Jul. 28, 2014 from counterpart EP App. No. 11867667.5.

* cited by examiner

US 8,919,376 B2

HYDRODYNAMIC RAM MITIGATING FUEL CELL STRUCTURE

TECHNICAL FIELD

The present application relates generally to fuel systems, and more specifically, to fuel systems adapted to mitigate hydrodynamic ram.

DESCRIPTION OF THE PRIOR ART

Hydrodynamic ram occurs when a projectile impacts a body of fluid at a high velocity, thus causes a rapid expansion of trailing vapor bubbles within the fluid. In more detail, the projectile creates a trailing low pressure region, which in turn causes the fluid to transition to a vapor state. The trailing vapor bubbles expand rapidly, thereby consuming more volume than the original fluid in the chamber. The expanding vapor bubbles exert a force on the fluid, which can be extremely destructive and represent significant risks to the aircraft.

There exist various devices and methods for mitigating hydrodynamic ram. In one embodiment, foam is adhered to the surrounding walls to the chamber. The foam provides absorbing means for the displacement created by the vapor bubbles. Another embodiment includes the use of non-structural foam baffles and/or effervescent bubbles disposed within the body of fluid. The baffles and effervescent bubbles enable small regions of compressibility. However, such features are costly to implement.

Although the foregoing developments represent great strides in the area of reducing hydrodynamic ram, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1:
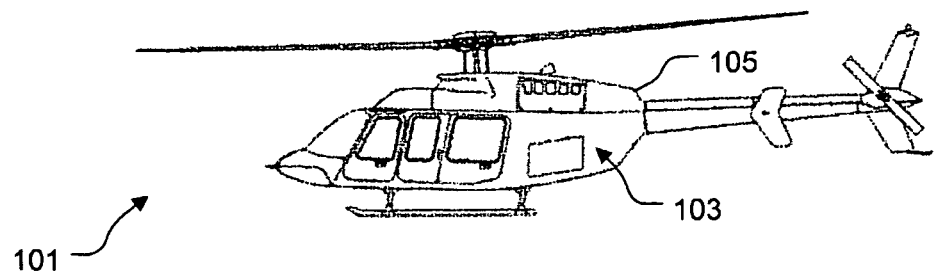
FIG. 1 is a side view of a conventional rotary aircraft.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The system and method of the present application provides effective means for mitigating hydrodynamic ram caused by a projectile within a chamber of fluid. Specifically, the system includes a structure disposed within the chamber that mitigates the hydrodynamic ram. The structure includes a plurality of orifices and channels adapted to vent and induce a premature phase change in the vapor bubble, thus minimizing the hydrodynamic ram forces exerted on the body of fluid during a ballistic impact.

It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
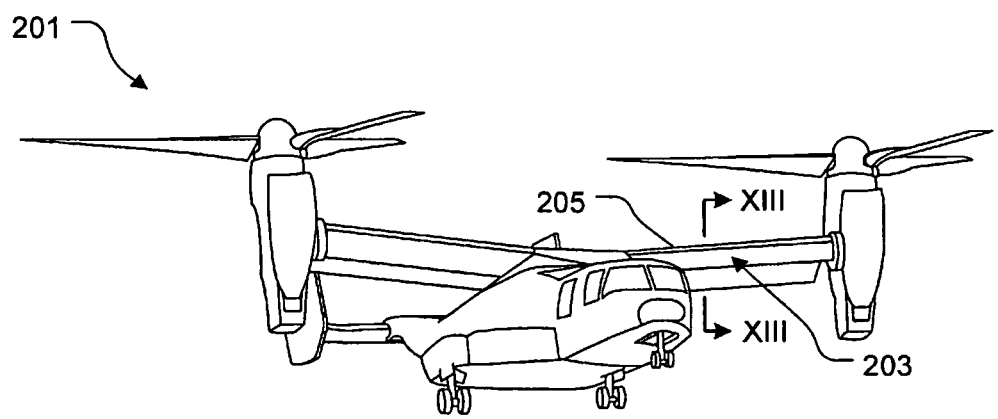
FIG. 2 is an oblique view of a conventional tiltrotor aircraft.

Referring now to the drawings, FIGS. 1 and 2 show two aircraft utilizing the fuel system of the present application. FIG. 1 shows a side view of a rotary aircraft 101, i.e., a helicopter, having a fuel system 103 according to the preferred embodiment of the present application, while FIG. 2 shows an oblique view of a tiltrotor aircraft 201 utilizing a fuel system 203 according to an alternative embodiment of the present application. Aircraft 101 preferably carries fuel system 103 at the rear of fuselage 105, while aircraft 201 preferably carries fuel system 203 within wing 205, i.e., a wet wing section of the wing. Further illustration and description of the fuel systems are provided below with reference to FIGS. 3-16.

In the exemplary embodiment, fuel systems 103 and 203 are shown operably associated with one or more different types of rotary aircraft, i.e., a helicopter and tiltrotor aircraft; however, it should will be appreciated that the fuel systems are easily adapted for use with other types of aircraft, including fixed and tilt-wing aircraft, and other types of vehicles, i.e., a land based vehicles, in lieu of the preferred embodiment. In addition, it should be understood that the necessary components, such as hoses, valves, ports, mounting attachments, control systems, and other required devices operably associated with the fuel systems are not shown, thus providing quick and easy depiction and description of the novel features of the present application; however, it should be understood that the fuel systems disclosed herein utilize the necessary devices for operation, as conventionally known in the art, although not shown in the drawings. Furthermore, the preferred embodiment is adapted to mitigate hydrodynamic damage to a fuel cell; however, the system and method could easily be adapted for use with other types of fluid systems in lieu of the preferred embodiment. For example, the features of the fuel systems discussed herein could easily be utilized with an oil or water system of a vehicle.

Figure 3:
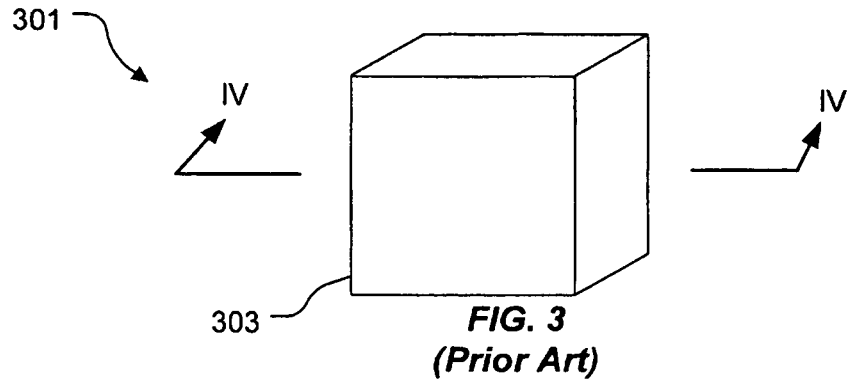
FIG. 3 is an oblique view of a conventional fuel system.
Figure 4:
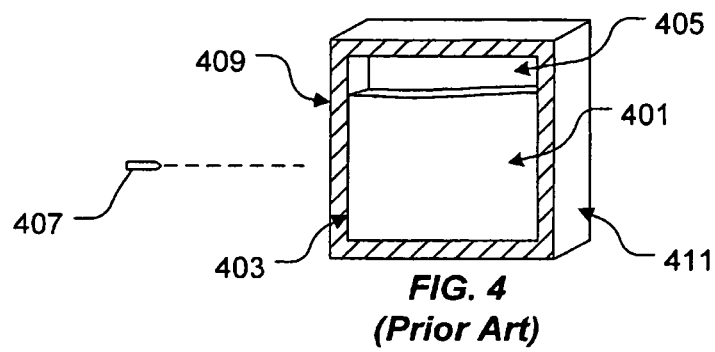
FIGS. 4-6 are cross-sectional views of the fuel system of FIG. 3 taken at IV-IV and depicting the effects of hydrodynamic ram as a projectile penetrates an inner chamber of the fuel system.

Referring to FIGS. 3 and 4 in the drawings, oblique and cross-sectional views of a conventional fuel system 301 are shown. Fuel system 301 comprises a fuel cell 303 having a fluidly sealed chamber 401 for holding a body of fuel 403 therein. FIG. 4 shows a cross-sectional view of fuel system 101 taken at IV-IV of FIG. 3. In the exemplary embodiment, chamber 403 is partially filled with fuel 401, while the remaining volume is ullage 405, which could include air and/or other types of gases.

Figure 5:
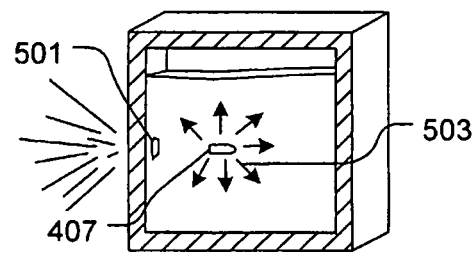
Figure 6:
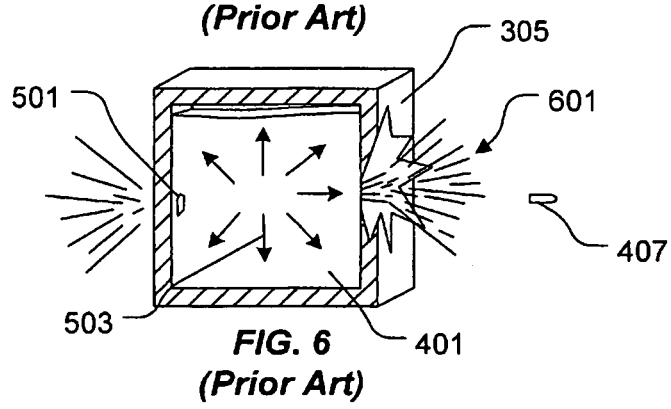
Figure 7:
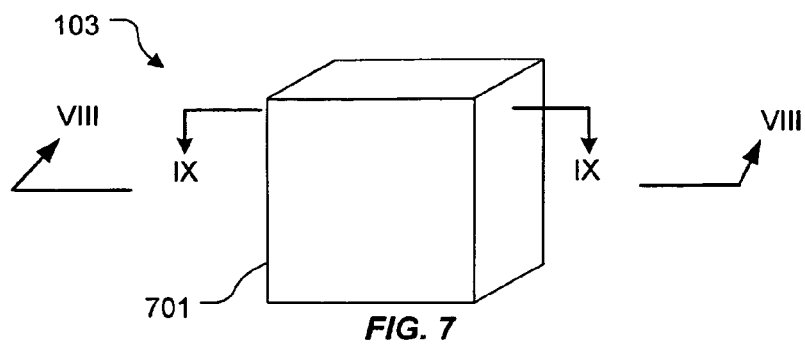
FIG. 7 is an oblique view of a fuel system according to the preferred embodiment of the present application.

FIGS. 5 and 6 provide illustration of the hydrodynamic effects of a projectile 407 on fuel cell 303. Projectile 407 has sufficient momentum to penetrate through a first sidewall 409 of fuel cell 303 and exit through a second sidewall 411, thus creating an entry impact area 501 and an exit impact area 601, which in turn results in leakage and/or shrapnel damage to nearby structures. As is shown, projectile 407 causes greater damage to second sidewall 411 than sidewall 409 due to the hydrodynamic ram created within chamber 401. Specifically, projectile 407, i.e., a bullet, travels at speed sufficient to create cavitation as the projectile passes through chamber 403, thus forming bubbles (not shown) within the incompressible fuel, which in turn exert an expanding force 503 on the inner surfaces of chamber 403.

Fuel system 103 is adapted to mitigate the effects of the hydrodynamic ram caused by projectile 407. FIGS. 7-10 show oblique and cross-sectional views of fuel system 103. Fuel system 103 comprises one or more of a fuel cell 701 having a fluidly sealed chamber 801 for holding a body of fuel 803 therein. In the exemplary embodiment, chamber 801 is partially filled with fuel 803, while the remaining volume is defined as ullage 805, which could include air, fuel vapor, and/or other forms of gas. Fuel system 103 is further provided with a core 807 of material utilized to mitigate the effects of the hydrodynamic ram caused by a projectile 809. In particular, fuel system 103 utilizes the structural properties of core 807 to provide additional strength to the fuel cell while capitalizing on the characteristics of flow through columns and orifices to significantly reduce the expansion of the trailing vapor bubble. In essence, core 807 acts like a baffle at a source of the bubble expansion to minimize its growth and adsorb its energy. Further illustration and description of core 807 is provided below.

Figure 11:
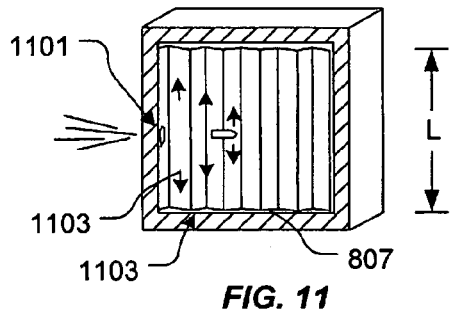
FIGS. 11 and 12 are cross-sectional views of the fuel system of FIG. 7 depicting the effects of hydrodynamic ram as a projectile penetrates an inner chamber of the fuel cell.
Figure 12:
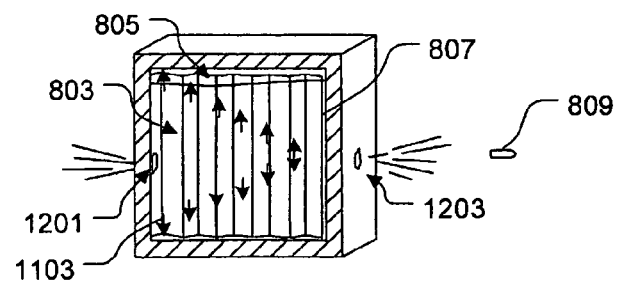

FIGS. 11 and 12 provide illustration of the hydrodynamic ram created by projectile 809. Projectile 809 has sufficient momentum to penetrate through a first sidewall 811 of fuel cell 701 and exit through a second sidewall 813, thus creating an entry impact area 1101 and an exit impact area 1201. As a result of core 807, exit impact area 1201 is smaller than impact area 601 (compare FIGS. 6 and 12) due to core 807 diverting the bubble directional flow 1103 created by projectile 809. As depicted with arrows, the bubbles are channeled through a plurality of columns 901, which in turn causes the bubbles to vent vertically to ullage 805 in chamber 801 in lieu of enforcing the displacement from the expanding bubble to the walls and sides of fuel cell 701.

Figures 8, 9, 10:
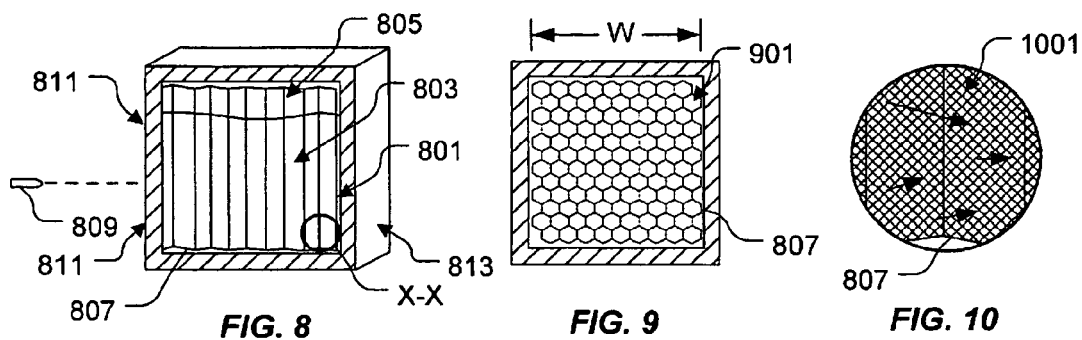
FIG. 8 is a cross-sectional view of the fuel system of FIG. 7 taken at VIII-VIII.
FIG. 9 is a cross-sectional view of the fuel system of FIG. 7 taken at IX-IX.
FIG. 10 is an enlarged view of a core of the fuel system of FIG. 7 taken at X-X.

In the preferred embodiment, core 807 is composed of weaved material 1001 adapted to enable fluid passage therethrough. FIG. 10 shows an enlarged view of a portion of core 807 taken at X-X of FIG. 8. Arrows indicate the directional movement of fuel 803 through a plurality of orifices 1003 created by weaved material 1001. It will be appreciated that the size of orifices 1003 can easily be modified to provide different flow rates. In the preferred embodiment, weaved material 1001 is formed of a rigid carbon based material, which is manufactured with a plurality of orifices through a weaving manufacturing process; however, it will be appreciated that alternative embodiments could include other suitable types of materials, i.e., different types of composites and/or metallic material, in lieu of the preferred embodiment.

Orifices 1003 greatly reduce the propagation of vapor bubbles formed by projectile 809. In particular, the vapor bubbles trailing projectile 809 are forced to either travel upwardly through columns 901 to ullage 805, as discussed above, or travel through orifices 1003, which causes localized pressure buildup, which in turn causes the vapor bubble to return to a fluid state prematurely. Thus, the dual feature of channeling the vapor bubble through column 901 and orifices 1003 significantly disrupts the formation of the vapor bubble.

Core 807 is preferably manufactured to fit snuggle within chamber 801. In the preferred embodiment, core 807 includes a length L and a width W that extend the entire length and width of the inner surfaces of chamber 801. Also, the preferred embodiment includes columns 901 extending relatively normal with respect to a lower surface 1105 of chamber 701. These features enables channels 901 to vent the vapor bubble to ullage 805. However, it will be appreciated that alternative embodiments could include columns oriented at various angles relative to surface 1105 in lieu of the preferred embodiment. Furthermore, core 807 could either be structurally or non-structurally attached to the inner surface of chamber 801 via a bonding agent and/or attachment device (see FIG. 13).

In the preferred embodiment, core 807 is a honeycomb structure having a plurality of columns 901, which extend the entire length L of the core and oriented at an angle of approximately 0 degrees relative to the lengthwise direction of core 807. However, it will be appreciated that alternative embodiments could include columns that extend at an angle with respect the lengthwise direction of core 807. The honeycomb core provides easy and rapid manufacturing means in addition to increased structural integrity of the fuel cell. In some embodiments, core 807 could be utilized as means for supporting the walls of fuel cell 701. For example, core 807 could replace one or more spars within the wing, thus reducing aircraft weight (see FIG. 13).

Rather than a parasitic solution using foam and other energy absorbing techniques around the perimeter of the fuel cell, fuel system 103 mitigates the loads generated during a hydrodynamic ram event at the source rather than designing surrounding core to accommodate the high impulse loads. It has been proven that the large cell size and loose weave construction of core 807 minimize the amount of fuel displacement, at approximately less than 3 percent.

Figure 13:
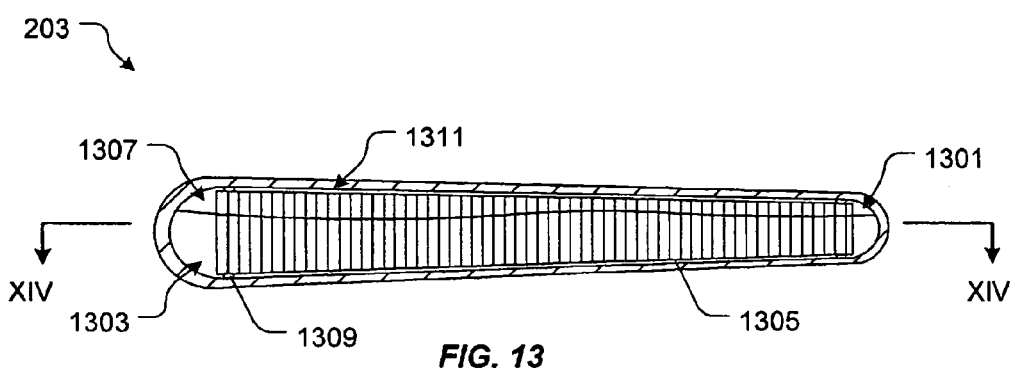
FIG. 13 is a cross-sectional view of the fuel system of FIG. 2 taken at XIII-XIII.
Figure 14:
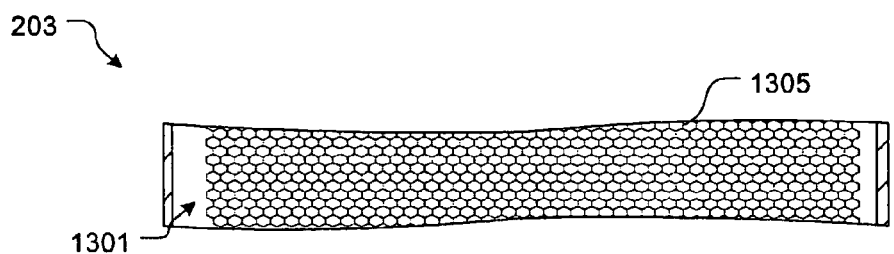
FIG. 14 is a cross-sectional view of the fuel system of FIG. 13 taken at XIV-XIV.

Referring now to FIGS. 13 and 14 in the drawings, cross-sectional views of an alternative embodiment of fuel system 103 are shown. FIG. 13 is a cross-sectional view of fuel system 203 taken at XIII-XIII of FIG. 2, while FIG. 14 is a cross-sectional view of fuel system 203 taken at XIV-XIV of FIG. 13. Fuel system 203 is substantially similar in function to fuel system 103. In particular, fuel system 203 is adapted to mitigate the effects of the hydrodynamic ram within a chamber caused by a projectile. It should be appreciated that the features of fuel system 203 could easily be adapted to include the features of fuel system 103, and likewise the features of fuel system 203 could be incorporated in fuel system 203.

Fuel system 203 is utilized with a wet section of wing 205 (see FIG. 2). Wing 205 forms a chamber 1301 for holding fuel 1303. Fuel system 203 includes a core 1305 substantially similar in form and function to core 807 discussed above, which is adapted to fit within chamber 1301. In the exemplary embodiment, chamber 1301 is partially filled with fuel 1303, while the remaining volume is define as ullage 1307. Fuel system 203 is further optionally provided with an attachment device 1309 adapted to secure core 1305 to an inner surface 1311. It should be appreciated that core 1301 could also couple to the inner surfaces of chamber 1301 through a reticulation bonding process. Fuel system 203 integrates a large cell core 1305 into the surrounding structure of chamber 1301 such that the volume of the fuel cell between the bulkheads, frames, and other devices operably associated with wing 205 is filled with core 1305. While core 1305 could be a non-structural member, additional benefits are gained through incorporation into the surrounding structure, i.e, additional structural integrity of wing 205.

Figure 15:
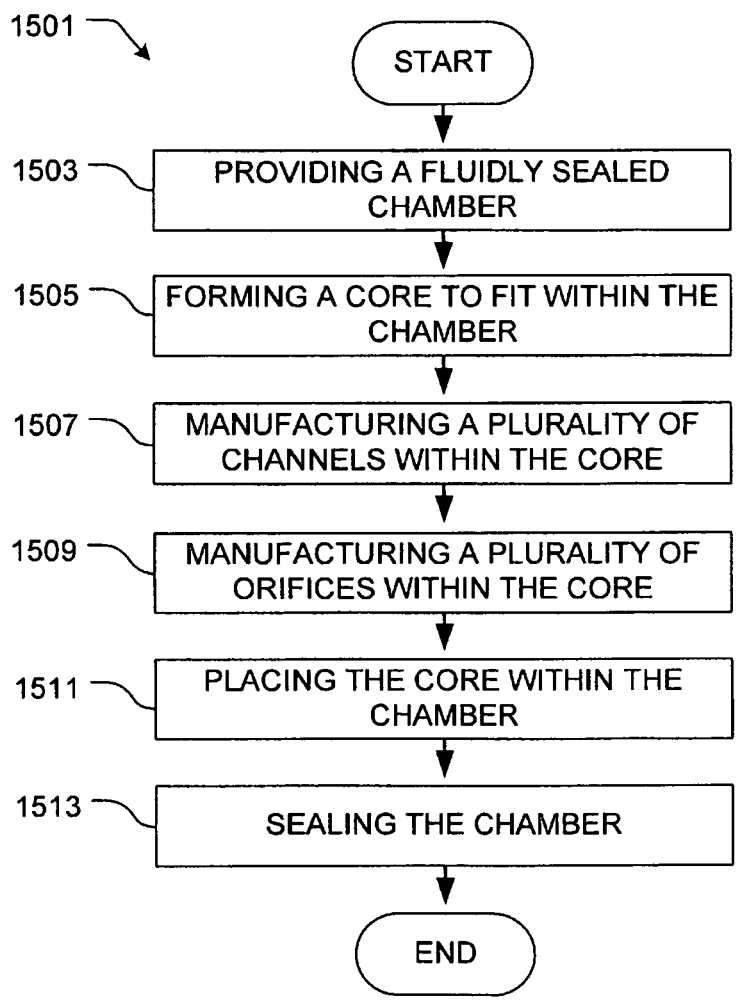
FIG. 15 is a flow chart of the preferred method to manufacture the fuel system.

Referring to FIG. 15 in the drawings, a flow chart 1501 depicts the preferred method of assembling fuel system 103 and fuel system 203. Box 1503 shows the first step, which includes providing a fluidly sealed chamber adapted to hold a body of fluid therein. The next three steps include the process of forming the core, which include: manufacturing the core to fit within the chamber, manufacturing a plurality of channels within the core, and manufacturing a plurality of orifices within the core, as depicted in boxes 1505, 1507, and 1509. The final steps include placing the core within the chamber and thereafter fluidly sealing the chamber, as depicted in boxes 1511 and 1513.

Figure 16:
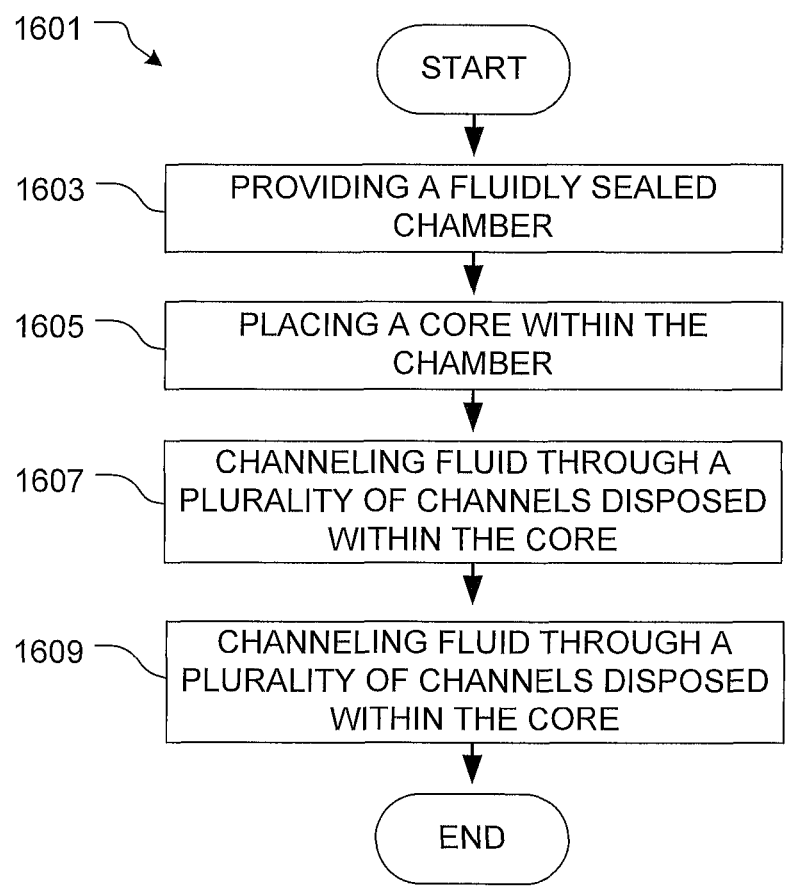
FIG. 16 is a flow chart of the preferred method to mitigate hydrodynamic ram.

Referring now to FIG. 16 in the drawings, a flow chart 1601 depicts the preferred method to mitigate the effects of hydrodynamic ram. Box 1603 shows the first step, which includes providing a fluidly sealed chamber adapted to hold a body of fluid therein. The next step includes placing a core within the chamber, as depicted in box 1605. Finally, fluid flow is channeled through a plurality of channels and a plurality of orifices disposed within the core, as depicted in box 1607.

It is apparent that a system and method having significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

The invention claimed is:

1. An aircraft fuel system adapted to mitigate hydrodynamic ram, the system comprising:
    a fluidly sealed chamber adapted to receive aircraft fuel; and
    a core composed of a weaved porous material and disposed within the chamber, the core being configured to extend a partial length of a height of the chamber such that a ullage space is created within chamber, the core having:
        a plurality of columns extending through the core, the plurality of columns being configured to channel a portion of a vapor bubble to ullage space disposed within the chamber, the ullage space being in fluid communication with each of the plurality of columns, the plurality of columns having a wall thickness; and
        a plurality of orifices extending through the thickness of the plurality of columns, the plurality of orifices providing fuel passage through the thickness of the plurality of columns, the plurality of orifices being configured to localized pressure buildup, which in turn causes the vapor bubble to return to a fluid state prematurely;
    wherein the vapor bubble from a foreign object entering the core is channeled to both the ullage space and through the plurality of orifices.

2. The fuel system of claim 1, wherein the plurality of columns are formed in a honeycomb configuration.

3. The fuel system of claim 1, wherein the fluidly sealed chamber is a section of an aircraft wing.

4. The fuel system of claim 1, wherein the aircraft is a helicopter.

5. The fuel system of claim 1, wherein the aircraft is a tiltrotor aircraft.

6. The fuel system of claim 1, the chamber comprising:
    an inner surface;
    wherein the core securely fastens to the inner surface.

7. The fuel system of claim 1, wherein the core is composed of carbon laminate material.

8. A fluid system to mitigate hydrodynamic ram, the system comprising:
    a fluidly sealed chamber adapted to receive fluid; and
    a core composed of a weaved porous material and disposed within the chamber, the core being configured to extend a partial length of a height of the chamber such that a ullage space is created within chamber, the core having:
        a plurality of columns extending through the core, the plurality of columns being adapted to channel a portion of a vapor bubble to the ullage space disposed within the chamber, the ullage space being in fluid communication with each of the plurality of columns, the plurality of columns having a wall thickness; and
        a plurality of orifices extending through the thickness of the plurality of columns, the plurality of orifices providing fluid passage through the thickness of the plurality of columns, the plurality of orifices being adapted to localized pressure buildup, which in turn causes the vapor bubble to return to a fluid state prematurely;
    wherein the vapor bubble from a foreign object entering the core is channeled to both the ullage space and through the plurality of orifices.

9. The system of claim 8, wherein the plurality of columns are formed in a honeycomb configuration.

10. The system of claim 8, wherein the fluidly sealed chamber is a section of an aircraft wing.

11. The system of claim 8, the chamber comprising:
    an inner surface;
    wherein the core securely fastens to the inner surface.

12. The system of claim 11, further comprising:
    an attachment device adapted to couple the core to the inner surface.

13. The system of claim 8, wherein the core is composed of carbon laminate material.

14. A method to mitigate hydrodynamic ram in a fluid chamber, comprising:
    placing a core within the fluid chamber;
    channeling a portion of a vapor bubble to an ullage space disposed within the chamber with a plurality of columns extending through the core;
    changing the fluid states of the vapor bubble with a plurality of orifices extending through a thickness of the plurality of columns composed of a weaved porous material;
    communicating the plurality of columns with the ullage space such that fluid passes from the plurality of columns to the ullage space;

wherein the vapor bubble from a foreign object entering the core is channeled to both the ullage space and through the plurality of orifices to reduce pressure buildup.

* * * * *